United States Patent
Ando et al.

(10) Patent No.: US 10,751,615 B2
(45) Date of Patent: *Aug. 25, 2020

(54) USER INTERFACE PROCESSING APPARATUS, METHOD OF PROCESSING USER INTERFACE, AND NON-TRANSITORY COMPUTER-READABLE MEDIUM EMBODYING COMPUTER PROGRAM FOR PROCESSING USER INTERFACE HAVING VARIABLE TRANSPARENCY

(71) Applicant: KABUSHIKI KAISHA SQUARE ENIX, Tokyo (JP)

(72) Inventors: Takehiro Ando, Tokyo (JP); Hidetoshi Aoyagi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 334 days.

This patent is subject to a terminal disclaimer.

(21) Appl. No.: 15/340,297

(22) Filed: Nov. 1, 2016

(65) Prior Publication Data

US 2017/0043250 A1 Feb. 16, 2017

Related U.S. Application Data

(63) Continuation of application No. 13/093,360, filed on Apr. 25, 2011, now Pat. No. 9,517,411.

(30) Foreign Application Priority Data

Apr. 28, 2010 (JP) ................................ 2010-103234

(51) Int. Cl.
*A63F 13/42* (2014.01)
*A63F 13/67* (2014.01)
(Continued)

(52) U.S. Cl.
CPC .......... *A63F 13/42* (2014.09); *A63F 13/2145* (2014.09); *A63F 13/25* (2014.09);
(Continued)

(58) Field of Classification Search
CPC .......... A63F 13/42; A63F 13/25; A63F 13/79; A63F 13/67; A63F 13/2145;
(Continued)

(56) References Cited

U.S. PATENT DOCUMENTS 5,617,114 A 4/1997 Bier et al.
5,726,688 A 3/1998 Siefert et al.
(Continued)

FOREIGN PATENT DOCUMENTS

JP 63-282524 11/1988
JP 11-212726 8/1999
(Continued)

OTHER PUBLICATIONS

Office Action from Japan Patent Office (JPO) in Japanese Patent Appl. No. 2014-194748, dated Oct. 17, 2017, together with a partial English language translation.
(Continued)

*Primary Examiner* — Amy M Levy
(74) *Attorney, Agent, or Firm* — Greenblum & Bernstein, P.L.C.

(57) ABSTRACT

An apparatus, method, and medium for controlling a progress of a video game are provided. A user interface element of the video game is displayed on a display screen. The user interface element is displayed with transparency determined during the progress of the video game. An operation to the user interface element displayed on the display screen is received regardless of the transparency. The progress of the video game is controlled in accordance with the operation to the user interface element displayed on the display screen.

13 Claims, 11 Drawing Sheets

(51) Int. Cl.

| | |
|---|---|
| *G06F 3/0488* | (2013.01) |
| *A63F 13/537* | (2014.01) |
| *A63F 13/2145* | (2014.01) |
| *G06F 9/451* | (2018.01) |
| *A63F 13/25* | (2014.01) |
| *A63F 13/79* | (2014.01) |

(52) U.S. Cl.
CPC ............ *A63F 13/537* (2014.09); *A63F 13/67* (2014.09); *A63F 13/79* (2014.09); *G06F 3/0488* (2013.01); *G06F 9/451* (2018.02); *A63F 2300/1075* (2013.01); *A63F 2300/308* (2013.01); *A63F 2300/6027* (2013.01); *A63F 2300/6045* (2013.01); *G06F 2203/04804* (2013.01)

(58) Field of Classification Search
CPC .............. A63F 13/537; A63F 2300/308; A63F 2300/6027; A63F 2300/6045; A63F 2300/1075; G06F 9/451; G06F 3/0488; G06F 2203/04804
See application file for complete search history.

(56) References Cited

U.S. PATENT DOCUMENTS

| | | | |
|---|---|---|---|
| 6,037,937 | A | 3/2000 | Beaton et al. |
| 6,118,427 | A * | 9/2000 | Buxton ................. G06F 3/0481 345/629 |
| 6,476,831 | B1 | 11/2002 | Wirth et al. |
| 6,607,445 | B1 | 8/2003 | Gendo et al. |
| 6,685,565 | B2 | 2/2004 | Tanibuchi et al. |
| 7,565,628 | B2 | 7/2009 | Kim et al. |
| 7,656,393 | B2 | 2/2010 | King et al. |
| 7,800,592 | B2 | 9/2010 | Kerr et al. |
| 8,070,596 | B2 | 12/2011 | Van Luchene |
| 9,009,621 | B2 | 4/2015 | Ahn et al. |
| 9,278,281 | B2 * | 3/2016 | Ito ........................... A63F 13/06 |
| 2002/0187834 | A1 | 12/2002 | Rowe et al. |
| 2002/0191029 | A1 | 12/2002 | Gillespie et al. |
| 2003/0222856 | A1 | 12/2003 | Fedorak et al. |
| 2004/0263487 | A1 | 12/2004 | Mayoraz et al. |
| 2005/0099400 | A1 | 5/2005 | Lee |
| 2005/0101376 | A1 | 5/2005 | Walker et al. |
| 2005/0131857 | A1 * | 6/2005 | Fujiki ................... G06F 3/0481 |
| 2005/0227762 | A1 | 10/2005 | Tahara et al. |
| 2006/0026535 | A1 * | 2/2006 | Hotelling .............. G06F 3/0418 715/863 |
| 2006/0050865 | A1 | 3/2006 | Kortum et al. |
| 2006/0197750 | A1 | 9/2006 | Kerr et al. |
| 2006/0197753 | A1 | 9/2006 | Hotelling |
| 2006/0238517 | A1 | 10/2006 | King et al. |
| 2006/0274944 | A1 | 12/2006 | Tanaka et al. |
| 2007/0018950 | A1 | 1/2007 | Ohta |
| 2007/0103454 | A1 | 5/2007 | Elias |
| 2007/0245269 | A1 | 10/2007 | Kim et al. |
| 2007/0265081 | A1 | 11/2007 | Shimura et al. |
| 2008/0088602 | A1 | 4/2008 | Hotelling |
| 2008/0163053 | A1 | 7/2008 | Hwang et al. |
| 2008/0261701 | A1 | 10/2008 | Lewin et al. |
| 2008/0318655 | A1 | 12/2008 | Davies |
| 2009/0082107 | A1 | 3/2009 | Tahara et al. |
| 2009/0295753 | A1 | 12/2009 | King et al. |
| 2010/0197398 | A1 * | 8/2010 | Masuda ................. A63F 13/218 463/31 |
| 2010/0331084 | A1 * | 12/2010 | Fuzell-Casey .......... A63F 13/69 463/31 |
| 2011/0077083 | A1 * | 3/2011 | Ahn ..................... G06F 3/04845 463/37 |
| 2011/0143835 | A1 * | 6/2011 | Sizelove ............ B64D 11/0015 463/31 |
| 2011/0157027 | A1 * | 6/2011 | Rissa ................... G06F 3/0416 345/173 |
| 2012/0274661 | A1 | 11/2012 | Ye et al. |
| 2013/0031515 | A1 | 1/2013 | Funabashi et al. |
| 2013/0038623 | A1 | 2/2013 | Tezuka et al. |
| 2013/0040733 | A1 * | 2/2013 | Yamamoto .............. A63F 13/69 463/31 |

FOREIGN PATENT DOCUMENTS

| | | |
|---|---|---|
| JP | 2001-084073 | 3/2001 |
| JP | 2002-000939 | 1/2002 |
| JP | 2004-000368 | 1/2004 |
| JP | 2004-151987 | 5/2004 |
| JP | 2005-204720 | 8/2005 |
| JP | 2006-343856 | 12/2006 |
| JP | 2007-011953 | 1/2007 |
| JP | 2007-164729 | 6/2007 |
| JP | 2007-181713 | 7/2007 |
| JP | 2007-293849 | 11/2007 |
| JP | 2008-183047 | 8/2008 |
| JP | 2008-537615 | 9/2008 |
| JP | 2010-086064 | 4/2010 |
| JP | 4937421 | 5/2012 |
| WO | 2006/094308 | 9/2006 |

OTHER PUBLICATIONS

Office Action from Japan Patent Office (JPO) in Japanese Patent Appl. No. 2017-034837, dated Mar. 20, 2018, together with a partial English language translation.
Office Action from Japan Patent Office (JPO) in Japanese Patent Appl. No. 2014-194748, dated Jan. 30, 2018, together with an partial English language translation.
Lettieri, Peter. 'Street Fighter 4' Released and Reviewed. Posted on Mar. 10, 2010 at TouchArcade. Retrieved from [http://toucharcade.com/2010/03/10/street-fighter-4-released-and-reviewed--as-we-get-our-fight-on/] on [Mar. 28, 2016]. 30 pages.
European search report dated Aug. 24, 2011.
Extended European Search Report from E.P.O. in European Application No. 11163846, dated Apr. 11, 2012.
Japan Office Action in JP 2010-103234, dated May 29, 2012, along with an English language translation thereof.
"The Quality of an iPhone app 'Street Fighter IV' is Too High", published by alt on Jun. 1, 2010, available at http://blog.alt-scape.com/archieves/379, along with an English language translation thereof.
Office Action from European Patent Office (EPO) in European Application No. 11163846.6, dated May 29, 2013.
Extended European Search Report (EESR) from European Patent Office (EPO) in European Patent Application No. 13186471.2, dated Dec. 20, 2013.
Office Action from Japan Patent Office (JPO) in Japanese Patent Appl. No. 2014-194748, dated Dec. 22, 2015, together with an English language translation.
Toyoizumi Brothers, "'Douse Mobile Game Desyo?' Nante Iwasenai Batsugun no Kanseido—iPhone ver. [Street Fighter IV]", [online] Famitsu.com, [Published on Mar. 25, 2010], available at URL: http://www.famitsu.com/game/news/1233121.sub.--1124.html, together with a partial English language translation.
Office Action from Japan Patent Office (JPO) in Japanese Patent Appl. No. 2014-194748, dated Sep. 6, 2016, together with an English language translation.
Office Action from Japan Patent Office (JPO) in Japanese Patent Appl. No. 2013-069754, dated May 20, 2014, along with an English translation thereof.
Office Action from Japan Patent Office (JPO) in Japanese Patent Appl. No. 2017-034837, dated Oct. 30, 2018, together with a partial English language translation.

* cited by examiner

Fig. 2

VIRTUAL CONTROLLER MANAGING TABLE

| CHARACTER ID | OPERATIONAL OBJECT FLAG | DISPLAY POSITION OF VIRTUAL CONTROLLER (INITIALLY TOUCHED POSITION) | WALKING ACTION (CENTER OF OPERATING SECTION IS MOVED AWAY FROM INITIAL POSITION BY MORE THAN PREDETERMINED DISTANCE) | RUNNING ACTION (PART OF OPERATING SECTION IS POSITIONED OUTSIDE CONTROLLER BODY) | ... |
|---|---|---|---|---|---|
| 001 | 1 | (x1,y1) | 1 | 0 | ... |
| 002 | 0 | — | — | — | ... |
| ... | ... | ... | ... | ... | ... |

GAME PROGRESS STATE INFORMATION MANAGING TABLE

| PLAYER NAME | PLAYER ID | CHARACTER NAME | CHARACTER ID | TOTAL PLAY TIME |
|---|---|---|---|---|
| PLAYER P | P001 | CHARACTER P1 | 001 | 26 HOURS |

LEARNING LEVEL INFORMATION TABLE

| PLAYER NAME | PLAYER ID | CHARACTER NAME | CHARACTER ID | LEARNING LEVEL |
|---|---|---|---|---|
| PLAYER P | P001 | CHARACTER P1 | 001 | 2 |

LEARNING LEVEL DETERMINING INFORMATION TABLE

| TOTAL PLAY TIME | LEARNING LEVEL |
|---|---|
| < 10 hours | 0 |
| 10 ≤ ,< 20 hours | 1 |
| 20 ≤ ,< 30 hours | 2 |
| 30 ≤ ,< 40 hours | 3 |
| 40 ≤ ,< 50 hours | 4 |
| ≥ 50 hours | 5 |

TRANSPARENCY DETERMINING INFORMATION TABLE

| LEARNING LEVEL | TRANSPARENCY |
|---|---|
| 0 | 0% |
| 1 | 20% |
| 2 | 40% |
| 3 | 60% |
| 4 | 80% |
| 5 | 100% |

USER INTERFACE PROCESSING APPARATUS, METHOD OF PROCESSING USER INTERFACE, AND NON-TRANSITORY COMPUTER-READABLE MEDIUM EMBODYING COMPUTER PROGRAM FOR PROCESSING USER INTERFACE HAVING VARIABLE TRANSPARENCY

CROSS REFERENCE TO RELATED APPLICATIONS

This application is a continuation of U.S. application Ser. No. 13/093,360 filed Apr. 25, 2011, which claims priority to Japanese Patent Application No. 2010-103234, filed on Apr. 28, 2010, the disclosures of which are expressly incorporated herein by reference in their entireties.

BACKGROUND OF THE INVENTION

1. Field of the Invention

The present invention relates to technique for a user interface applied to a device for controlling of various kinds of applications such as video games, for example.

2. Description of the Related Art

Heretofore, various kinds of video games such as a video game called an RPG (role-playing game: a game in which a player plays a role of a character in a world of the game, and accomplishes a predetermined object while enjoying a process that the character grows through various experiences), a simulation game and the like have been provided.

In recent years, as such video games, various kinds of video games, which allow a player to intuitively carry out various kinds of operations using a touch panel or the like, have been proposed.

In order to operate an object such as a character displayed on a display screen in a game using a touch panel, conventionally, a virtual controller or an action icon is displayed on a display screen and an operation input by a user or player is received using this virtual controller or the like.

As such a game, Japanese Patent Application Publication No. 2008-183047, for example, describes a game in which a player makes a touch input on an image to move the image into a predetermined area on a display screen and makes a touch input on an image region of a determination button to cause the video game to proceed.

However, in such a conventional video game, the virtual controller or the like for receiving an operation input from a user is fixedly displayed at a predetermined position on a display screen. Therefore, there has been a problem in which disadvantage may occur that a display portion of the virtual controller becomes a blind area and a game item and the like displayed in the portion become invisible.

The problem described above is not limited to a video game, and the similar problem has also been inherent in various kinds of other applications.

SUMMARY OF THE INVENTION

The present invention has been made in order to solve the problem described above, and it is an object of the present invention to improve operability of a touch device.

In order to achieve the above object, in one aspect of the present invention, the present invention is directed to a user interface processing apparatus according to the present invention. The user interface processing apparatus according to the present invention includes a user interface element display controller that displays a user interface element on a display screen.

The user interface processing apparatus also includes an operation receiver that receives an operation to the user interface element displayed on the display screen.

The user interface processing apparatus also includes an application controller that controls the application in accordance with the operation received by the operation receiver.

The user interface processing apparatus also includes a transparency determiner that determines transparency of the user interface element.

In this case, the user interface element display controller displays the user interface element with the transparency determined by the transparency determiner.

By configuring the user interface processing apparatus in this manner as described above, it becomes possible to improve operability of a touch device.

In the user interface processing apparatus according to the present invention, it is preferable that the user interface processing apparatus further includes a learning level determiner that determines a learning level of a player in accordance with a control state of the application. In this case, the transparency determiner may determine the transparency to increase in accordance with the learning level determined by the learning level determiner.

In the user interface processing apparatus according to the present invention, it is preferable that the learning level determiner determines the learning level in accordance with the control state of the application including a length of time the application is used and the number of executions of a predetermined function in the application.

In the user interface processing apparatus according to the present invention, it is preferable that the user interface processing apparatus further includes a continuing operation detector that detects whether an operation state of the user interface element received by the operation receiver continues for a certain period of time. In this case, the transparency determiner may determine the transparency to increase in a case where the continuing operation detector detects that the operation state continues for a certain period of time.

In the user interface processing apparatus according to the present invention, it is preferable that the user interface processing apparatus further includes: a touch receiver that receives a touch on the display screen by means of a touch operation on a touch panel by the player; a touched position detector that detects a touched position on the display screen when the touch receiver receives the touch on the display screen; and a touch termination determiner that determines, after the touch receiver receives the touch on the display screen, whether a touched state on the display screen is terminated or not. In this case, the user interface element display controller may display the user interface element at a predetermined position according to the touched position detected by the touched position detector in a case where the touch receiver receives the touch on the display screen. Further, the user interface element display controller may terminate the display of the user interface element in a case where the touch termination determiner determines that the touched state is terminated.

In the user interface processing apparatus according to the present invention, it is preferable that the touched position detector continuously detects the touched position until the touched state is terminated after the touch receiver receives the touch on the display screen. In this case, the operation receiver may receive a moving direction instruction operation specified based upon a direction from an initial touched position to a current touched position, the initial touched position being a position detected by the touched position detector when the touch receiver first receives the touch on the display screen, the current touched position being a position on the display screen currently detected by the touched position detector after the initial touched position is detected. Further, the application controller may move an object in the application in a direction from the initial touched position to the current touched position in accordance with the moving direction instruction operation received by the operation receiver.

In the user interface processing apparatus according to the present invention, it is preferable that the user interface element is a virtual controller that includes a controller body formed in a substantially circular shape and an operating section capable of moving in an arbitrary direction from a center position of the controller body. In this case, the user interface element display controller may fixedly display the controller body at the predetermined position corresponding to the initial touched position, and displays the operating section movably in a direction from the initial touched position to the current touched position using a center position of the controller body as a base point.

In the user interface processing apparatus according to the present invention, it is preferable that the operation receiver receives a movement speed instruction operation specified based upon a distance between the initial touched position and the current touched position. In this case, the application controller may move the object at a speed according to the distance between the initial touched position and the current touched position in accordance with the movement speed instruction operation received by the operation receiver.

In the user interface processing apparatus according to the present invention, it is preferable that the user interface element is a virtual controller that includes a controller body formed in a substantially circular shape and an operating section capable of moving in an arbitrary direction from a center position of the controller body. In this case, the user interface element display controller may fixedly display the controller body at the predetermined position corresponding to the initial touched position, and display the operating section so as to move away from the initial touched position in a stepwise manner in accordance with the distance between the initial touched position and the current touched position in a direction from the initial touched position to the current touched position using a center position of the controller body as a base point.

In the user interface processing apparatus according to the present invention, it is preferable that the user interface element display controller displays the user interface element in a case where the touched state on the display screen continues for a predetermined period of time after the touch receiver first receives the touch on the display screen.

In the user interface processing apparatus according to the present invention, it is preferable that the user interface processing apparatus is a video game processing apparatus for controlling a progress of a video game as the application.

Further, in another aspect of the present invention, the present invention is directed to a method of processing a user interface according to the present invention. The user interface processing method according to the present invention includes displaying a user interface element on a display screen.

The user interface processing method also includes receiving an operation to the user interface element displayed on the display screen.

The user interface processing method also includes controlling the application in accordance with the operation received by the operation receiver.

The user interface processing method also includes determining transparency of the user interface element.

In this case, in the displaying the user interface element, the user interface element may be displayed with the transparency determined in the determining the transparency.

Moreover, in still another aspect of the present invention, the present invention is directed to a non-transitory computer-readable medium embodying a computer program for processing a user interface so as to control an application. The computer program according to the present invention causes a computer to execute steps including displaying a user interface element on a display screen.

The steps also include receiving an operation to the user interface element displayed on the display screen The steps also include controlling the application in accordance with the operation received by the operation receiver.

The steps also include determining transparency of the user interface element.

In this case, in the displaying the user interface element, the user interface element may be displayed with the transparency determined in the determining the transparency.

According to the present invention, it becomes possible to improve operability of a touch device.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of virtual controller information;

DETAILED DESCRIPTION OF THE INVENTION

Hereinafter, examples of one embodiment according to the present invention will be described with reference to the appending drawings.

Figure 1:
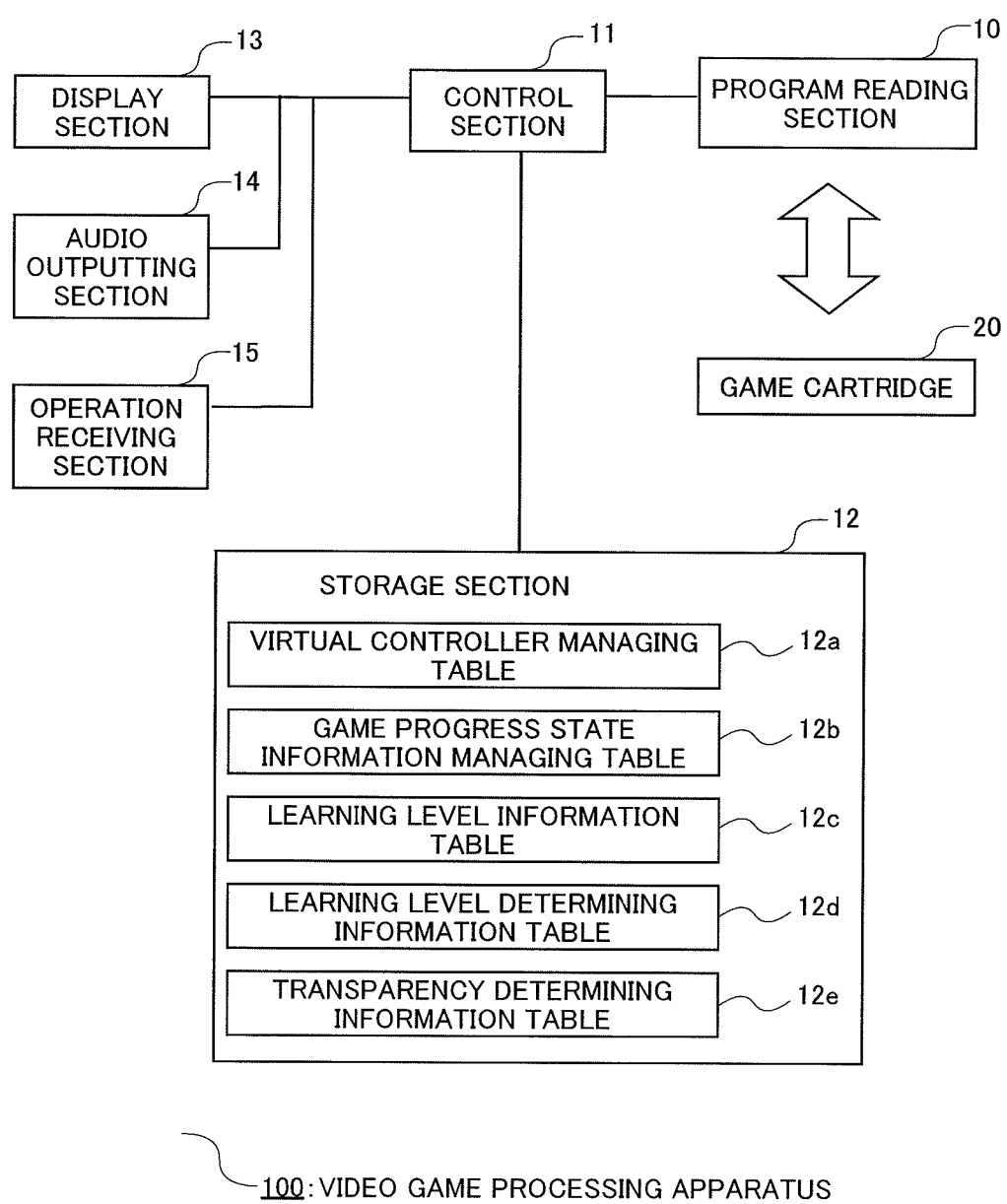
FIG. 1 is a block diagram showing a constructive example of a video game processing apparatus according to one embodiment of the present invention.

FIG. 1 is a block diagram showing an exemplary configuration of a video game processing apparatus 100 showing one embodiment of the present invention. As shown in FIG. 1, the video game processing apparatus 100 includes: a program reading section 10; a control section 11; a storage section 12; a display section 13; an audio outputting section 14; and an operation receiving section 15.

The program reading section 10 has a function to read out a necessary video game program from the storage section 12 into which a storage medium, in which various kinds of video game programs are stored, is embedded. In this regard, in the present embodiment, the program reading section 10 has a mounting section into which the game cartridge 20 for storing the video game program is detachably mounted. The program reading section 10 reads out the video game program from the storage medium of the game cartridge 20, which is mounted into the mounting section by a player (i.e., an operator or a user of the video game processing apparatus 100), to store the read-out video game program in the storage section 12. In this regard, a video game used in the present embodiment and carried out in accordance with the video game program may be a video game such as an RPG, a simulation game, a puzzle game or a battle game, so long as the video game is the one in which an object that can move in a virtual space of the video game in response to an operation by the player exists.

The control section 11 has a function to carry out game programs read out by the program reading section 10 and stored in the storage section 12 and a function to carry out various kinds of controls to cause the video game to proceed in accordance with operations by the player.

The storage section 12 is a storage medium for storing a video game program required when the video game is caused to proceed and various kinds of data. The storage section 12 is configured by a nonvolatile memory such as a RAM, for example. Various kinds of information to be registered and updated in accordance with a progress of the game, and various kinds of information read out froma storage medium embedded in the game cartridge 20 for using the game are stored in the storage section 12.

In this regard, the video game processing apparatus 100 may be configured so that the video game program is downloaded from a game program providing server (not shown in the drawings) via a communication network such as the Internet and is stored in the storage section 12.

In the present embodiment, the storage section 12 includes a virtual controller managing table 12a in which virtual controller information is contained. The control section 11 refers to the virtual controller information so as to display the virtual controller on a display screen. The virtual controller is used for receiving, from the player, an operation input for a predetermined object (in the present embodiment, a player character which can be operated by the player) in the virtual space of the video game displayed on the display screen of the display section 13. The storage section 12 further includes a game progress state information managing table 12b in which game progress state information is contained. The game progress state information allows a progress state of the video game to be specified. The storage section 12 further includes a learning level information table 12c in which learning level information is contained. The learning level information indicates a learning level of the player. The storage section 12 further includes a learning level determining information table 12d in which learning level determining information is contained. The learning level determining information indicates determination rules for determining the learning level of the player. The storage section 12 further includes a transparency determining information table 12e in which transparency determining information is contained. The transparency determining information indicates determination rules for determining transparency of the virtual controller.

FIG. 2 is an explanatory drawing showing an example of a storage state of the virtual controller information stored in the virtual controller managing table 12a. As shown in FIG. 2, the virtual controller information contains a character ID, an operational target flag, coordinate information and action execution conditions for a player character. The character ID is used for uniquely specifying the player character. In the operational target flag, "1" is set to a player character that serves as an operational target by the player, and "0" is set to player characters each of which does not serve as an operational target. The coordinate information indicates a display position of the virtual controller on the display screen of the display section 13 (in the present embodiment, the coordinate of an "initial touched (or pressed) position" (described later) is set up). In a case where the action execution condition for the player character is met, "1" is set for the corresponding action. In a case where the action execution condition for the player character is not met, "0" is set to the corresponding action.

The action execution condition for the player character is met or satisfied based on a position of an operating section constituting the virtual controller (described later). In the present embodiment, a walking action or running action of the player character is determined in accordance with the display position of the operating section.

Here, the virtual controller according to the present embodiment will be described.

Figures 3, 4, 5:
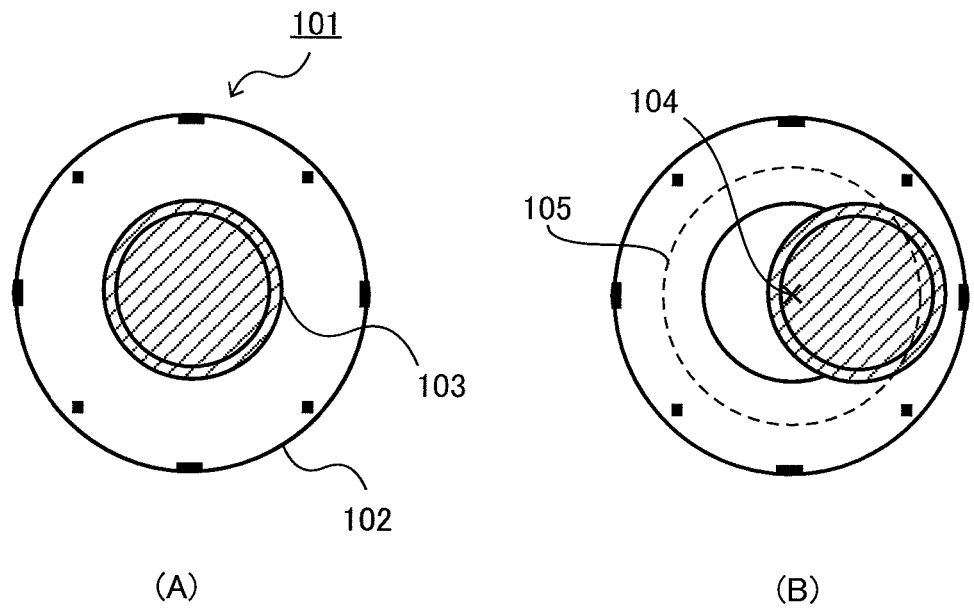
FIG. 3 is a flowchart showing an example of a virtual controller.
FIG. 4 is an explanatory drawing showing an example of a storage state of game progress state information.
FIG. 5 is an explanatory drawing showing an example of a storage state of learning level information.

FIG. 3 is an explanatory drawing showing an example of the virtual controller according to the present embodiment. As shown in FIG. 3A, a virtual controller 101 is constructed from a controller body 102 formed in a substantially circular shape and an operating section 103 capable of moving in an arbitrary direction from a center position of the controller body 102. Meanwhile, a shape or a configuration of the virtual controller 101 is not limited to this configuration.

In the present embodiment, the virtual controller 101 is fixedly displayed with its center at a touched position (initial touched position) in a case where the display screen is touched by the player (that is, when a touch on the display screen by means of a touch with a finger of the player on the display screen (contact operation) is received). Otherwise, the virtual controller 101 may be displayed at a position that is somewhat shifted from the touched position of the display screen. In this case, it may be configured so that the player determines the display position of the virtual controller 101 with respect to the touched position.

FIG. 3A is an explanatory drawing showing the virtual controller 101 immediately after it is displayed on the display screen. As shown in FIG. 3A, the operating section 103 is arranged at the center of the controller body 102 (that is, an initial position of the operating section 103), and is displayed so as to be capable of moving in response to operations by the player. In the present embodiment, the player's operation is like a dragging operation, that is, an operation of moving a touched position while keeping a finger and the like touching on the display screen.

Namely, for example, when the dragging operation to a right direction is received from the player at the state where the virtual controller 101 is displayed on the display screen, as shown in FIG. 3B, the operating section 103 is displayed so as to be moved from the initial position to the right direction. In addition, an amount of movement of the operating section 103 and a moving direction thereof against the initial position are determined in accordance with a distance and a direction from the initial touched position to a touched position after the dragging operation (i.e., a current touched position) within a predetermined range of movement. Namely, for example, the longer the distance between the initial touched position and the current touched position is, the largely the operating section 103 is shifted from the initial position.

Here, as mentioned in the explanation of the virtual controller information (see FIG. 2), in the present embodiment, an action that the player character carries out varies depending upon whether a part of the operating section 103 is moved outside of a display region of the controller body 102 or not (that is, whether the center of the operating section 103 exceeds a movable region 105 or not). Further, in a case where the operating section 103 is positioned inside the display region of the controller body 102, an action that the player character carries out also varies depending upon whether the center of the operating section 103 is moved away from the initial position 104 by more than a predetermined distance or not. These are managed in the virtual controller managing table 12a. In the present embodiment, in a case where the center of the operating section 103 is moved away from the initial position 104 by more than a predetermined distance, "1" is set to the "walking action". In a case where the center of the operating section 103 exceeds the movable region 105, "0" is set to the "walking action" and "1" is set to the "running action". An action relating to the virtual controller 101 will be described in detail together with an operation of the video game processing apparatus 100.

FIG. 4 is an explanatory drawing showing an example of a storage state of the game progress state information, which is stored in the game progress state information managing table 12b. As shown in FIG. 4, the game progress state information contains: a player name indicating a name of each player; a player ID capable of uniquely specifying the player; a character name indicating a name of a player character for each player; a character ID for uniquely specifying the player character; and a total play time. In the present embodiment, the total playtime is used as information for specifying a progress state of the video game. The progress state of the video game is referred to when a learning level (a level of skill) of the player is determined. Namely, it is assumed that the longer the total play time of the video game is, the higher the learning level is. The game progress state information is updated by the control section 11 whenever the progress state of the video game (in the present embodiment, total play time) is changed.

FIG. 5 is an explanatory drawing showing an example of a storage state of the learning level information, which is stored in the learning level information table 12c. As shown in FIG. 5, the learning level information contains: a player name indicating a name of each player; a player ID capable of uniquely specifying the player; a character name indicating a name of each player character; a character ID for uniquely specifying the player character; and a value indicating the learning level (learning level value).

Figures 6, 7, 8:
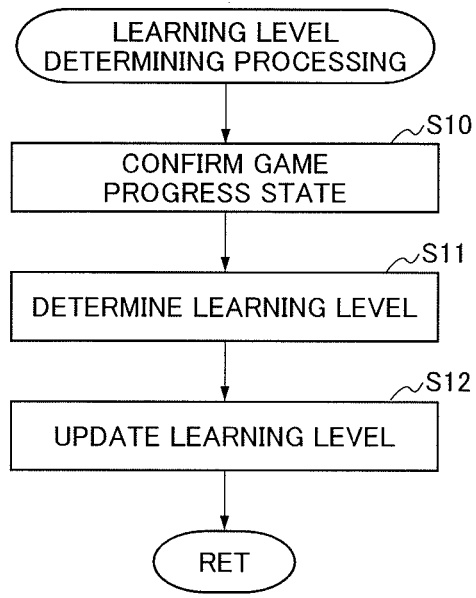
FIG. 6 is an explanatory drawing showing an example of a storage state of learning level determining information.
FIG. 7 is an explanatory drawing showing an example of a storage state of transparency determining information.
FIG. 8 is a flowchart showing an example of learning level determining processing.

FIG. 6 is an explanatory drawing showing an example of a storage state of the learning level determining information, which is stored in the learning level determining information table 12d. As shown in FIG. 6, the learning level determining information is information in which the total play time is associated with the learning level for each player. In the present embodiment, a learning level is classified into any of six steps including 0 to 5. The higher the learning level is, the larger the learning level value is.

FIG. 7 is an explanatory drawing showing an example of a storage state of the transparency determining information, which is stored in the transparency determining information table 12e. As shown in FIG. 7, the transparency determining information is information in which the learning level of the player is associated with transparency of the virtual controller 101. In the present embodiment, different levels of transparency are associated with each step of the learning levels, and the transparency becomes higher as the learning level becomes high. In the present embodiment, the transparency determining information is set up as follows. Namely, the transparency is set to 0% (i.e., the virtual controller 101 is displayed as being completely opaque) in a case where the learning level is the lowest (i.e., in a case where the learning level value is zero). On the other hand, the transparency is set to 100% (i.e., the virtual controller 101 is invisible on the display screen as being completely transparent) in a case where the learning level is highest (i.e., in a case where the learning level value is five).

The display section 13 is a display device for displaying a game screen in response to operations by the player in accordance with control by the control section 11. The display section 13 is constructed by a liquid crystal display, for example.

The audio outputting section 14 has a function to output audio in response to operations by the player or an action of any character in accordance with control by the control section 11.

The operation receiving section 15 receives operational signals in response to operations by the player, and notifies the control section 11 of its result. In the present embodiment, the operation receiving section 15 receives operations by the player via a touch panel provided in the display section 13. Otherwise, the operation receiving section 15 may be configured so as to receive operations by the player via a controller such as a mouse or a game pad.

Next, an operation of the video game processing apparatus 100 according to the present embodiment will be described.

FIG. 8 is a flowchart showing an example of learning level determining processing carried out by the video game processing apparatus 100. The learning level determining processing is carried out regularly during a progress of the video game, for example. Here, a case where a learning level of a player P is determined and the learning level of the player P is updated as needed will be described as an example. In this regard, an explanation of any action and processing with no relationship to the present invention will be omitted.

In the learning level determining processing, the control section 11 first refers to the game progress state information stored in the game progress state information managing table 12b to confirm a game progress state for the player P (Step Sb). In the present embodiment, the control section 11 confirms a total play time of the player P as the game progress state.

Next, the control section 11 refers to the learning level determining information stored in the learning level determining information table 12d to determine the learning level of the player P in accordance with the game progress state confirmed at Step S10 (Step S11). In the present embodiment, the control section 11 refers to the learning level determining information, and determines that a learning level corresponding to the total play time of the player P confirmed at Step S10 is set to a learning level for the player P.

The control section 11 then refers to the learning level information stored in the learning level information table 12c. In a case where the learning level of the player P determined at Step S11 differs from the learning level of the player P set in the learning level information, the control section 11 updates the learning level of the player P in the learning level information to the learning level determined at Step S11 (Step S12).

As described above, the learning level of the player P is determined in accordance with the game progress state and the learning level is updated when the learning level is changed.

Figure 9:
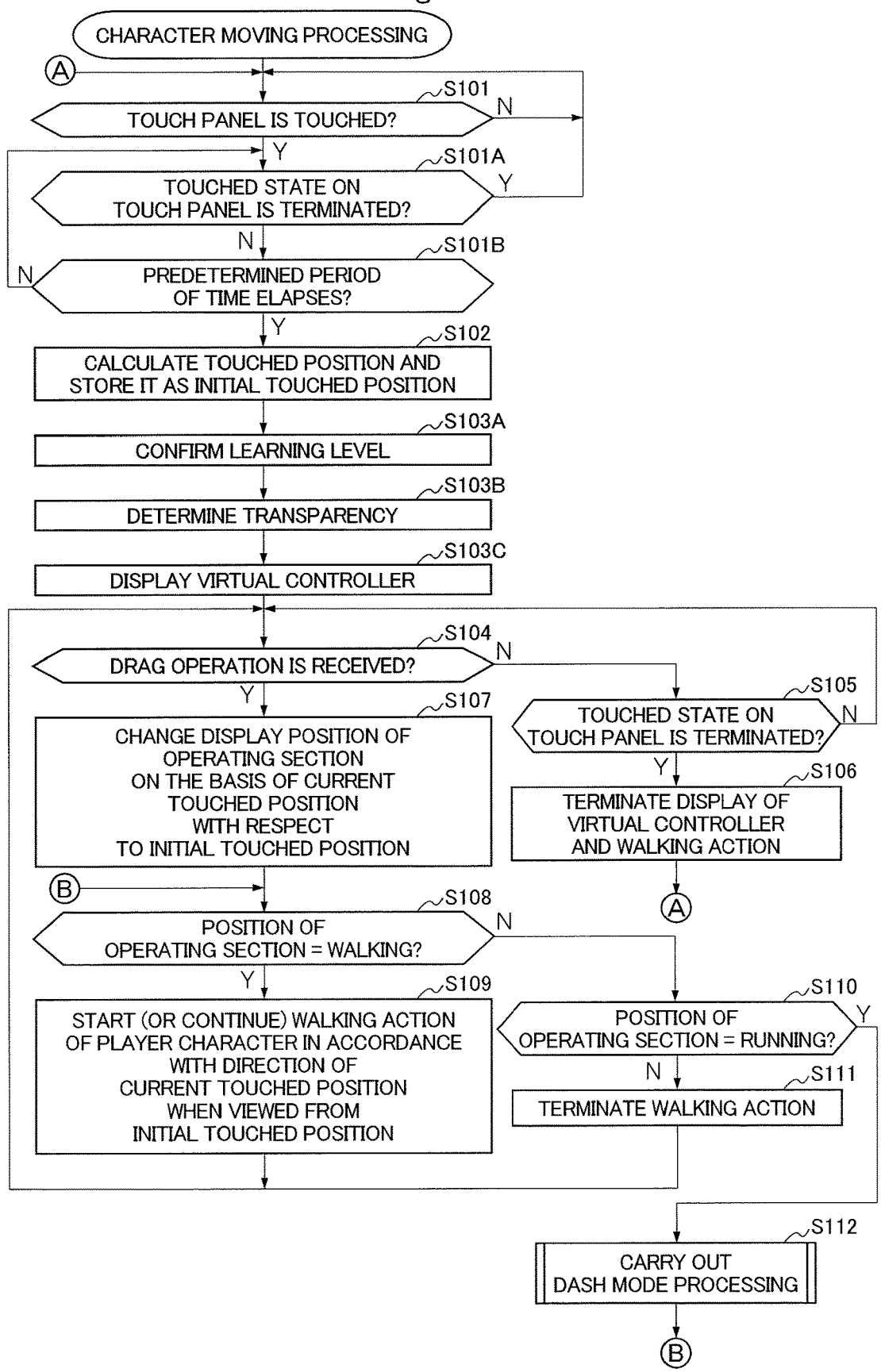
FIG. 9 is a flowchart showing an example of character moving processing.

FIG. 9 is a flowchart showing an example of character moving processing carried out by the video game processing apparatus 100. The character moving processing is started when a player character P1 becomes operable by the player P in accordance with a progress of the video game.

In the character moving processing, processing for carrying out an action of the player character P1, which is an operational target, is carried out in response to operations by the player P using the virtual controller 101. In this regard, an explanation of any action and processing with no relationship to the present invention will be omitted.

Figure 10:
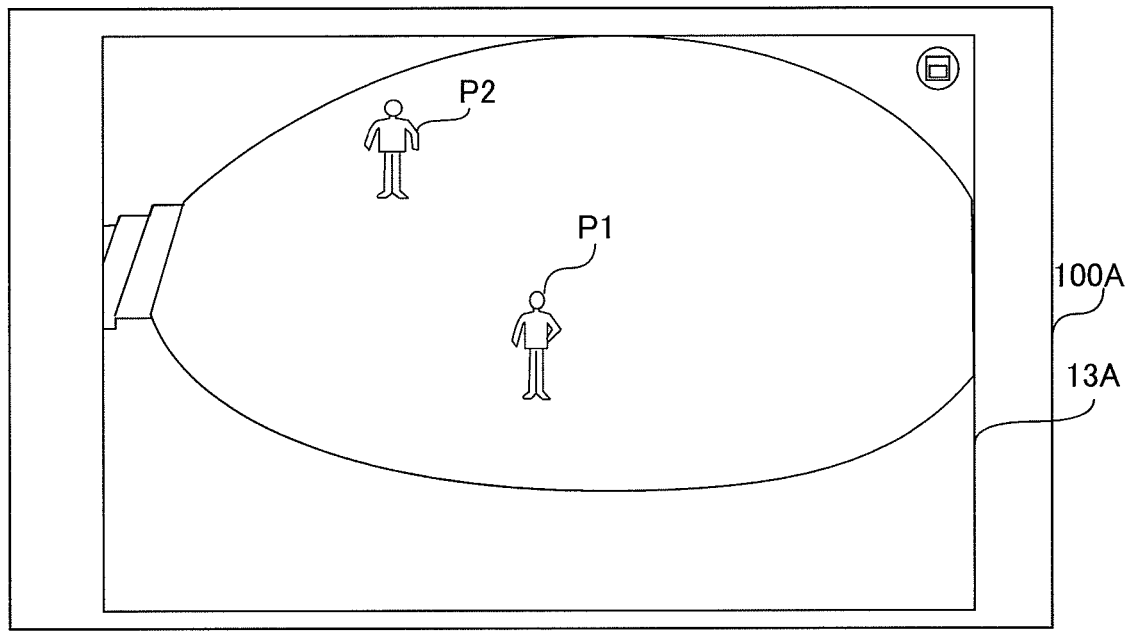
FIG. 10 is an explanatory drawing showing an example of a game screen.

FIG. 10 is an explanatory drawing showing an example of the game screen displayed on the display screen 13A of the display section 13, which is provided on a housing 100A of the video game processing apparatus 100. Here, as shown in FIG. 10, a description will be provided for an example to a case where the player character P1 which is in a state so as to be operated by the player P and a non-player character P2 operated by the control section 11 exist in a game field.

In the character moving processing, the control section 11 determines whether the display screen 13A is touched by the player P or not (that is, whether the touch panel provided in the display screen 13A is touched or not) (Step S101).

In a case where it is determined that the display screen 13A is touched ("Yes" at Step S101), the control section 11 determines whether the touched state on the display screen 13A (that is, the touch panel provided in the display screen 13A) is terminated or not (Step S101A). In a case where it is determined that the touched state on the display screen 13A is not terminated ("No" at Step S101A), the control section 11 determines whether a predetermined period of time (for example, 0.1 seconds) elapses since it is determined at Step S101 that the display screen 13A was touched or not (Step S101B). In a case where it is determined that the touched state on the display screen 13A is terminated before the predetermined period of time elapses ("Yes" at Step S101A), the control section 11 causes the processing flow to return to Step S101. Thus, it is configured so that the processing is stopped in a case where the touched state on the display screen 13A is terminated before the predetermined period of time elapses. Therefore, it is possible to exclude a tap operation such as an instantaneous touch on the display screen 13A from a subject of the character moving processing. This allows the virtual controller 101 not to be displayed if it is not necessary. In this case, such a tap operation may be received as a separate input operation from an operation for displaying the virtual controller 101.

In a case where it is determined that the predetermined period of time elapses before the touched state on the display screen 13A is terminated ("Yes" at Step S101B), the control section 11 calculates a touched position, and stores the calculated touched position in the virtual controller managing table 12a as an initial touched position (Step S102).

Next, the control section 11 refers to the learning level information stored in the learning level information table 12c to confirm the learning level of the player P (Step S103A). When the learning level of the player P is confirmed, the control section 11 refers to the transparency determining information stored in the transparency determining information table 12e, and determines that transparency corresponding to the learning level of the player P confirmed at Step S103A is set to transparency of the virtual controller 101 (Step S103B).

Subsequently, the control section 11 causes the display section 13 to display the virtual controller 101 with the transparency determined at Step S103B on the display screen 13A with its center at the initial touched position stored at Step S102 (Step S103C).

Figure 11:
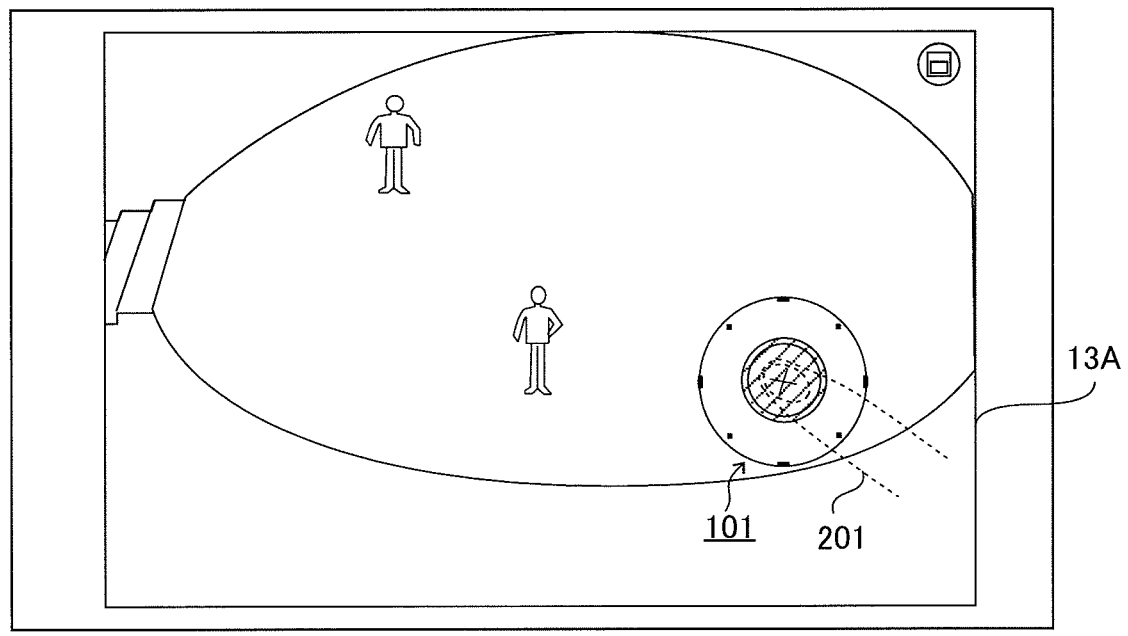
FIG. 11 is an explanatory drawing showing an example of a game screen.

FIG. 11 is an explanatory drawing showing an example of the game screen at this time. As shown in FIG. 6, for example, when a certain point on the display screen 13A is touched by means of a finger 201 of the player P, the virtual controller 101 is displayed with its center at the touched position. Although it is not shown in FIG. 11, the virtual controller 101 is displayed on the display screen 13A with the transparency determined at Step S103B. In a case where the transparency of the virtual controller 101 is more than 0%, an object being positioned at the display position of the virtual controller 101 on the game field is visibly displayed through the virtual controller 101. Further, in a case where the transparency of the virtual controller 101 is 100%, the virtual controller 101 does not appear on the display screen 13A perfectly. In a case like this, however, since the player is assumed to be one with a high learning level, the player can operate the virtual controller 101 as if the virtual controller 101 appears on the display screen 13A.

When the virtual controller 101 is displayed, the control section 11 determines whether a dragging operation by the player P is received or not (Step S104).

In a case where it is determined that the dragging operation by the player P is not received ("No" at Step S104), the control section 11 determines whether the touched state on the display screen 13A (that is, the touch panel provided in the display screen 13A) is terminated or not (Step S105). Here, in a case where it is determined that the touched state on the display screen 13A is not terminated ("No" at Step S105), the control section 11 causes the processing flow to return to Step S104.

On the other hand, in a case where it is determined that the touched state on the display screen 13A is terminated ("Yes" at Step S105), the control section 11 terminates display of the virtual controller 101. Further, in a case where the player character P1 carries out a walking action, the control section 11 terminates the walking action (Step S106), and causes the processing flow to return to Step S101.

On the other hand, in a case where it is determined at Step S104 that the dragging operation by the player P is received ("Yes" at Step S104), the control section 11 changes the display position of the operating section 103 based on the current touched position with respect to the initial position (Step S107).

When the display position of the operating section 103 is changed, the control section 11 refers to the virtual controller information in the virtual controller managing table 12a, and determines whether the position of the operating section 103 indicates "walking" or not (Step S108). Here, in a case where it is determined that the position of the operating section 103 indicates the "walking" ("Yes" at Step S108), the control section 11 starts (or continues) processing necessary for a walking action of the player character P1 in a direction at which the operating section 103 is displayed viewed from the initial position (that is, a direction from the initial touched position to the current touched position) (Step S109), and causes the processing flow to return to Step S104.

Figure 12:
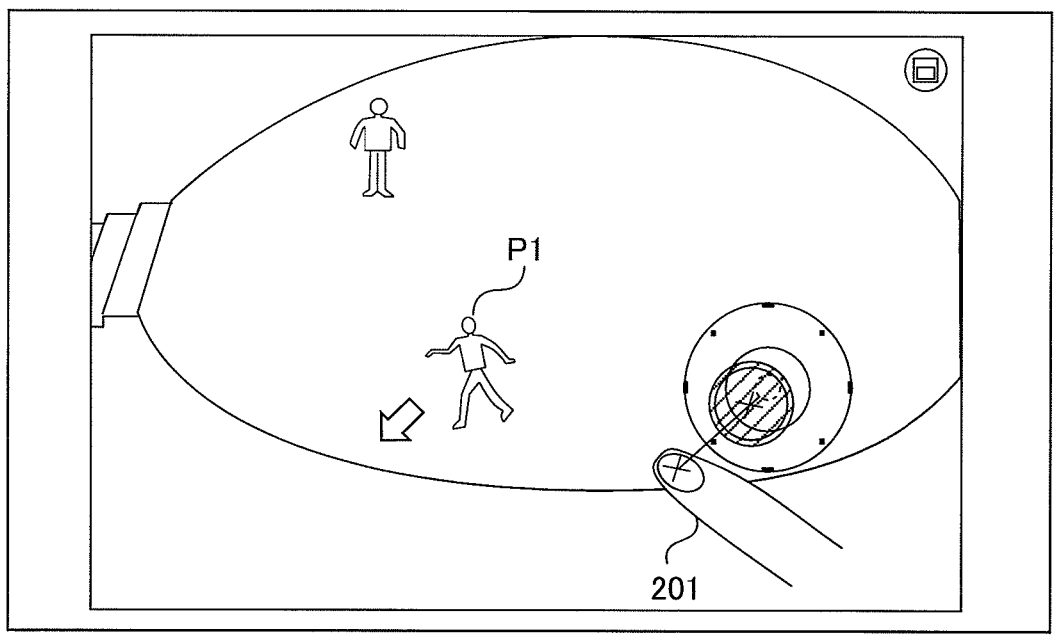
FIG. 12 is an explanatory drawing showing an example of a game screen.

FIG. 12 is an explanatory drawing showing an example of the game screen at this time. As shown in FIG. 12, a walking action of the player character P1 is carried out toward the same direction as the direction from the initial touched position to the current touched position by means of the finger 201 of the player P.

On the other hand, in a case where it is determined that the position of the operating section 103 does not indicate the "walking" ("No" at Step S108), the control section 11 determines whether the position of the operating section 103 indicates "running" or not (Step S110). Here, in a case where it is determined that the position of the operating section 103 does not indicate the "running" ("No" at Step S110) and the player character P1 carries out a walking action, the control section 11 terminates the walking action (Step S111), and causes the processing flow to return to Step S104.

On the other hand, in a case where it is determined that the position of the operating section 103 indicates the "running" ("Yes" at Step S110), the control section 11 carries out dash mode processing (Step S112), and causes the processing flow to return to Step S108.

The character moving processing is terminated when the progress of the video game becomes a state where the player P is not able to input any operation to the player character P1.

Further, the character moving processing according to the present embodiment is designed so that the display position of the operating section 103 varies in a stepwise manner in accordance with a distance between the initial touched position and the current touched position. Namely, for example, when the distance between the initial touched position and the current touched position becomes the predetermined distance or more, the display position of the operating section 103 is changed from the initial position to the predetermined position.

Next, the dash mode processing will be described.

Figure 13:
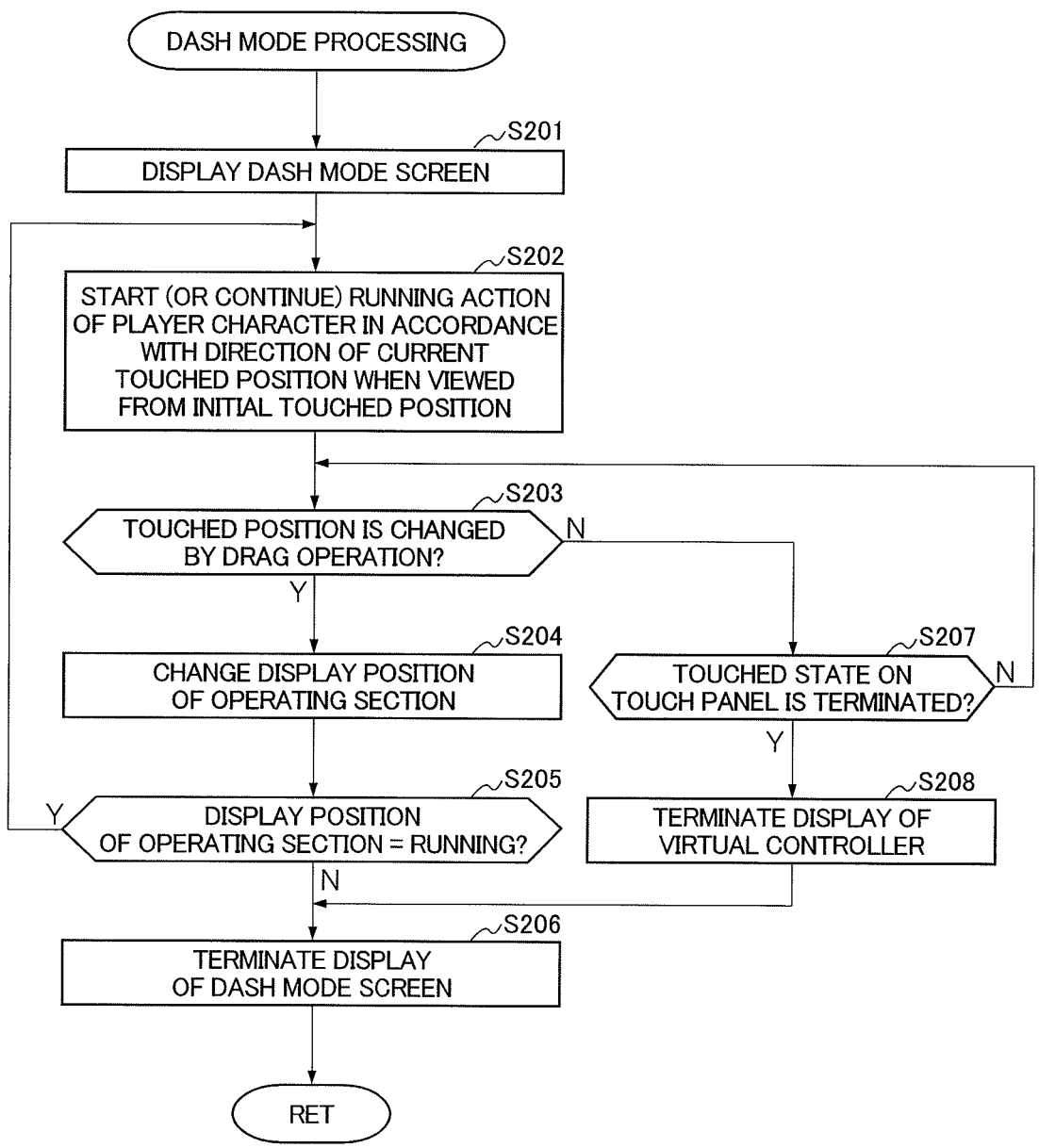
FIG. 13 is a flowchart showing an example of dash mode processing.

FIG. 13 is a flowchart showing an example of the dash mode processing carried out by the video game processing apparatus 100.

In the dash mode processing, the control section 11 first switches the game screen displayed on the display screen 13A to the dash mode screen (Step S201). Here, the dash mode screen is a screen for clearly showing to the player P that the player character P1 carries out a running action. In the present embodiment, on the dash mode screen, the transparency of the virtual controller 101 is increased or decreased in accordance with the distance between the initial touched position and the current touched position. Switching the transparency of the virtual controller 101 as described above gives the player feedback that the display mode is switched to the dash mode. In addition, the visibility of the game screen is improved.

When the dash mode screen is displayed, the control section 11 carries out processing necessary for starting (or continuing) a running action of the player character P1 in accordance with a direction of the current touched position viewed from the initial touched position (Step S202).

Figure 14:
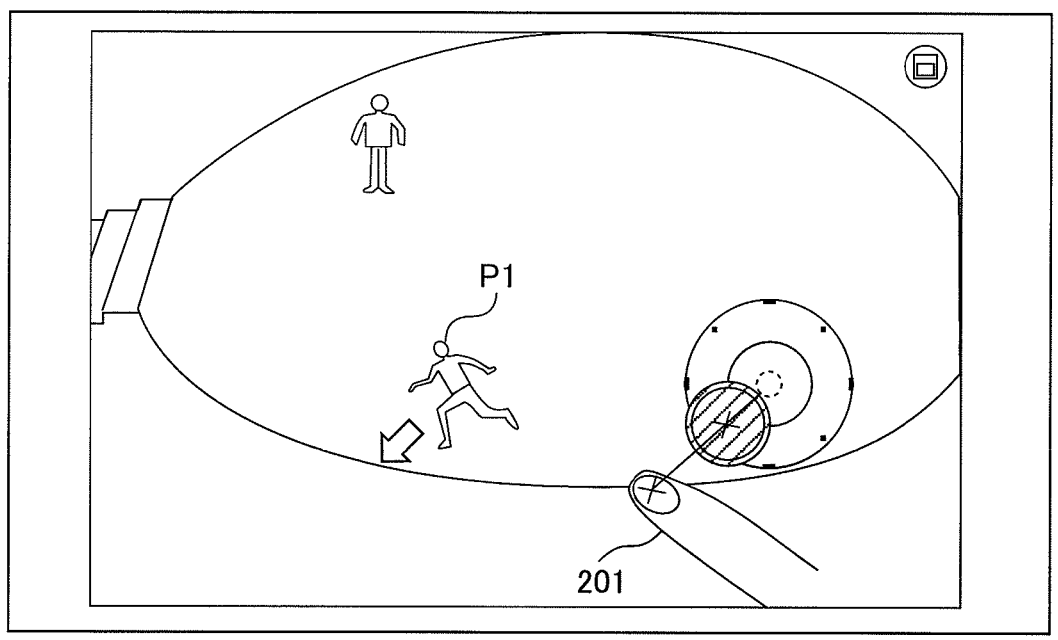
FIG. 14 is an explanatory drawing showing an example of a game screen.

FIG. 14 is an explanatory drawing showing an example of the game screen at this time. As shown in FIG. 14, the player character P1 carries out a running action toward the same direction as the direction from the initial touched position to the current touched position by means of the finger 201 of the player P. In this case, the control section 11 controls a movement speed of the player character P1 so that the longer the distance between the initial touched position and the current touched position is, the faster the movement speed of the player character P1 is.

Subsequently, the control section 11 determines whether the touched position of the display screen 13A is changed by means of the dragging operation by the player P or not (Step S203). Here, in a case where it is determined that the touched position is changed by means of the dragging operation ("Yes" at Step S203), the control section 11 changes the display position of the operating section 103 in accordance with the initial touched position and the current touched position after changed (Step S204).

When the display position of the operating section 103 is changed, the control section 11 determines whether the display position of the operating section 103 indicates a running action of the player character P1 or not (Step S205). Here, in a case where it is determined that the display position of the operating section 103 does not indicate the running action of the player character P1 ("No" at Step S205), the control section 11 causes the processing flow to return to Step S202.

On the other hand, in a case where it is determined that the display position of the operating section 103 indicates the running action of the player character P1 ("Yes" at Step S205), the control section 11 terminates the display of the dash mode screen (Step S206), and causes the processing flow to return to Step S108 in the character moving processing (see FIG. 9).

On the other hand, in a case where it is determined at Step S203 that the touched position is not changed by means of the dragging operation ("No" at Step S203), the control section 11 determines whether a touched state on the display screen 13A (touch panel provided in the display screen 13A) is terminated or not (Step S207). Here, in a case where it is determined that the touched state on the display screen 13A is not terminated ("No" at Step S207), the control section 11 causes the processing flow to return to Step S203. In a case where it is determined that the touched state on the display screen 13A is terminated ("Yes" at Step S207), the control section 11 terminates the display of the virtual controller 101 (Step S208), and causes the processing flow to return to Step S206.

In addition, although the video game processing apparatus 100 has been explained as an example in the embodiment described above, the present invention may be applied to any device so long as it is a device that carries out user interface processing using an input device such as a touch panel. Therefore, the similar processing to those in each of the embodiments described above may also be carried out for user interface processing for an operation to an object (a user interface element) in any other applications than the video game.

Further, in the embodiment described above, the user interface processing apparatus is configured so that the virtual controller 101 is displayed when the display screen 13A is touched by the player P. However, the virtual controller 101 may always be displayed fixedly at a predetermined position on the display screen 13A. Further, the user interface processing apparatus may be configured so that only a major component (s) of the virtual controller 101 is displayed. More specifically, the virtual controller 101 may be displayed, which is composed of only components that are likely to be used. That is, other component (s) that is likely to be used only in a specific mode such as an expert mode may not be displayed as a part of the virtual controller. Moreover, the display position of the virtual controller 101 may be fixed when the learning level is low. On the other hand, the display position of the virtual controller 101 may not be fixed when the learning level becomes a predetermined value or more.

Further, in the embodiment described above, the user interface processing apparatus is configured so that the total playtime is utilized as the game progress state for determining the learning level. However, the total play time is just one example, and the learning level may be determined based upon the number of cleared stages, whether a specific stage is cleared or not, the number of executions of a specific function, and the like. Further, the learning level may be determined based upon action contents by the player as the game progress state including: for example, whether a specific operation in the application (for example, a dash operation) is utilized or not; whether a specific condition (for example, running without hit against a wall) set up in advance is met or not; whether one or more specific item(s) is acquired or not; the number of operation mistakes; whether the player finishes a first tutorial or not; the number of times repetitive actions due to mistakes of the player are detected; and whether a predetermined user option is utilized or not.

It is thought that there is no need to clearly display the virtual controller 101 if the player gets used to the operations. For example, there will be no problem even if the transparency of the virtual controller 101 is increased in accordance with the learning level of the player, and thereby even if the virtual controller 101 gets completely transparent (i.e., not displayed) to an advanced-level player. In particular, in a case of an application such as a video game, a player concentrates more on the game screen than the virtual controller 101. Therefore, it is thought that there will be no problem for operations even if a virtual controller such as a cross key or a virtual pad is not displayed.

Further, in the embodiment described above, a case where the transparency of the virtual controller 101 is increased in accordance with the learning level of the player P has been explained. However, the user interface processing apparatus may be configured so as to: monitor whether an operation state of the virtual controller 101 continues for a certain period of time or not; and carry out processing for increasing the transparency of the virtual controller 101 in a case where it is detected that the operation state continues for the certain period of time. It is thought that the player pays attention to the game field without being conscious of the virtual controller 101 while the same operation continues for a certain period of time. For that reason, it is thought that there will be no problem for operations of the player if the transparency of the virtual controller 101 is increased and even if it becomes invisible (i.e., not displayed) on the display screen in a case where the operation state of the virtual controller 101 continues for a certain period of time. In this regard, in a case where the same operation state for the virtual controller 101 continues, the transparency of the virtual controller 101 may be increased as its duration becomes longer.

As explained above, in the embodiment described above, the user interface processing apparatus (for example, the video game processing apparatus 100) for controlling the application (for example, video game) may be configured so as to: display the user interface element (for example, virtual controller 101) on the display screen 13A; receive an operation for the user interface element displayed on the display screen 13A; control the application in accordance with the received operation; determine the transparency of the user interface element; and display the user interface element with the determined transparency. Therefore, it becomes possible to improve operability of a touch device.

Further, in the embodiment described above, the user interface processing apparatus (for example, the video game processing apparatus 100) for controlling the application (for example, video game) may be configured so as to: display the virtual controller 101 on the display screen 13A; receive an operation of the virtual controller 101 displayed on the display screen 13A; control the application in accordance with the received operation; determine a learning level of the player in accordance with a control state of the application (for example, a control state based upon a progress state of the video game, such as a total play time and the number of cleared stages, and an action of the player); and display the virtual controller 101 whose transparency is increased in accordance with a height of the determined learning level. Therefore, it becomes possible to improve operability of the touch device.

Namely, for example, with respect to a player with a high learning level, the virtual controller 101 can be displayed without completely covering the screen or the virtual controller 101 may not be displayed at all. This makes it possible to display the screen so that the player can view a virtually displayed state of the virtual controller 101 (displayed object) in which the virtual controller 101 is superimposed on the screen. Therefore, without disturbing operations by the player, it becomes possible to reduce occupancy of the virtual controller 101 on the display screen (i.e., an application screen); to improve visibility of the display screen; and to use the display screen widely.

Meanwhile, for example, the virtual controller 101 may be displayed fixedly at a lower left region of the display screen before the learning level of the player gets raised. In a case where the player's learning level is raised, the virtual controller 101 may be displayed at an arbitrary touched position like the embodiment described above. In such a case, the virtual controller 101 may be caused to be semi-transparent or transparent in accordance with various progress statuses of the video game such as the player's learning level.

Further, in the embodiment described above, the user interface processing apparatus (for example, the video game processing apparatus 100) may be configured so that the transparency of the user interface element that receives an operation by the user is increased in a case where it is detected that the operation by the user against the user interface element (for example, virtual controller 101) continues for a certain period of time. In such a case, it becomes possible to improve operability of the touch device.

Namely, it is thought that the player pays attention to the game field without being conscious of the virtual controller 101 while the same operation continues for a certain period of time. For that reason, the virtual controller 101 can be displayed without completely covering the screen or may not be displayed at all. This makes it possible to display the screen so that the player can view a virtually displayed state of the virtual controller 101 (displayed object) in which the virtual controller 101 is superimposed on the screen. Therefore, without disturbing operations by the player, it becomes possible to reduce occupancy of the virtual controller 101 on the application screen; to improve visibility of the display screen; and to use the display screen widely.

Further, in the embodiment described above, the user interface processing apparatus (for example, the video game processing apparatus 100) may be configured so as to: receive a touch on the display screen 13A by means of a touch operation on a touch panel by the player; detect a touched position (for example, initial touched position), which is a position on the display screen 13A that is touched when the touch on the display screen 13A is received; determine, after the touch on the display screen 13A is received, whether a touched state on the display screen 13A is terminated or not; display the virtual controller 101 at a predetermined position (for example, with its center at initial touched position) according to the detected touched position in a case where the touch on the display screen 13A is received; and terminate the display of the virtual controller 101 in a case where it is determined that the touched state is terminated. This makes it possible to improve operability of the touch device. In this case, since the virtual controller 101 is not displayed at a fixed position, an effect obtained by increasing the transparency of the virtual controller 101 can be heightened.

Namely, the virtual controller 101 can be displayed at an arbitrary point on the display screen and the operational target object can be operated in accordance with changes in the touched position until the touch on the touch panel is terminated. Thus, for example, it is possible to prevent an important portion (i.e., an important area or region on the display screen) from becoming a blind area by displaying the virtual controller 101 in another portion, which is not important.

Further, it is possible to arrange the virtual controller 101 at an arbitrary position. Thus, the operability of the touch device is hardly deteriorated depending on a size of a hand of the player and a method of gripping the touch device (for example, a position on the display screen at which the player finds it to easily carry out a touch operation may be different depending upon whether the player grips the touch device laterally or vertically). Further, even in a case where the touch device is gripped with one hand, operability of the touch device is also hardly deteriorated.

Further, in the embodiment described above, the user interface processing apparatus (for example, video game processing apparatus 100) may be configured so as to: determine whether the touched state on the display screen 13A is terminated after the touch on the display screen 13A was received or not; and terminate the display of the virtual controller in a case where it is determined that the touched state is terminated. Therefore, the display of the virtual controller can be terminated when an operation of the virtual controller by the player is terminated. Namely, the virtual controller can be displayed only when necessary, and the display screen can be utilized widely by not displaying the virtual controller when not necessary. Therefore, it becomes possible to improve operability of the touch device.

Further, in the embodiment described above, the user interface processing apparatus (for example, video game processing apparatus 100) may be configured so as to: continuously detect the touched position until the touched state is terminated after the touch on the display screen 13A is received; receive the moving direction instruction operation (for example, dragging operation) specified based upon the direction from the initial touched position on the display screen detected when the touch on the display screen 13A is first received to the current touched position on the display screen 13A detected after the initial touched position was detected; and carryout control to move the object in the application (for example, player character P1) in the direction from the initial touched position to the current touched position in accordance with the received moving direction instruction operation. Therefore, the moving direction instruction operation of the object displayed on the display screen can be carried out simply.

Further, in the embodiment described above, the user interface processing apparatus (for example, video game processing apparatus 100) may be configured so that the virtual controller 101 includes the controller body 102 formed in a substantially circular shape and the operating section 103 capable of moving in an arbitrary direction from the center position of the controller body 102. In this case, the controller body 102 is displayed at a predetermined fixed position in accordance with the initial touched position (for example, with its center at the initial touched position), and the operating section 103 is displayed movably in the direction from the initial touched position to the current touched position using the center position of the controller body 102 as a base point. Therefore, a player can easily recognize how an operation input by the player is reflected.

Further, in the embodiment described above, the user interface processing apparatus (for example, video game processing apparatus 100) may be configured so that a movement speed instruction operation (for example, dragging operation) specified based upon a distance between the initial touched position and the current touched position is received. The user interface processing apparatus may further be configured to control the object (for example, player character P1) to move at the speed according to the distance between the initial touched position and the current touched position in response to the received movement speed instruction operation (for example, a walking action or running action is carried out in accordance with the position of the operating section 103 whose display position is determined based upon the distance between the initial touched position and the current touched position). Therefore, it is possible to change the action of the object, which is an operational target, by means of a simple operation. Further, by configuring the user interface processing apparatus so as to add the movement speeds in accordance with the distance between the initial touched position and the current touched position in an analog manner, the player is allowed to easily adjust the movement speed of the object serving as an operational target.

In this case, the user interface processing apparatus may receive the movement speed instruction operations in a predetermined number of levels so that the movement speeds of the object are specified at the levels respectively in accordance with a distance interval between the initial touched position and the current touched position. Alternatively, the user interface processing apparatus may receive an operation to gradually change the movement speed of the object in an analog manner in accordance with the distance between the initial touched position and the current touched position. In the latter case, for example, as the distance between the initial touched position and the current touched position becomes longer, the movement speed instruction operation is gradually changed in the order of walking, trot, running and dash, and the movement speed of the object thus becomes faster gradually.

Further, in the embodiment described above, the user interface processing apparatus (for example, video game processing apparatus 100) may be configured so that the virtual controller 101 includes the controller body 102 formed in a substantially circular shape and the operating section 103 capable of moving in an arbitrary direction from a center position of the controller body 102. In this case, the controller body 102 is displayed at the predetermined fixed position (for example, with its center at the initial touched position) in accordance with the initial touched position. Further, the operating section 103 is displayed as being able to move in a direction from the initial touched position to the current touched position using the center position of the controller body 102 as a base point so as to move away from the initial touched position in a stepwise manner in accordance with the distance between the initial touched position and the current touched position. Therefore, a player is able to easily recognize how an operation input by the player is reflected.

Further, in the embodiment described above, the user interface processing apparatus (for example, video game processing apparatus 100) may be configured so that the virtual controller 101 is displayed in a case where the touched state on the display screen 13A continues for a predetermined period of time after a touch on the display screen 13A is first received. This makes it possible to display the virtual controller 101 only when necessary, and there is no fear to bring an operator (or player) confusion.

Although it has not been mentioned particularly in the embodiment described above, the video game processing apparatus 100 may be configured so as to: display a predetermined event icon on the display screen 13A in a case where the movement control (for example, walking or running) for the player character P1 is carried out in response to an operation of the virtual controller 101 and a predetermined event condition for causing an event such as a conversation with other character to occur in the video game is thereby met; and carry out a corresponding event in a case where the touched state is terminated in the state in which the event icon is displayed or the event icon is selected. By configuring the video game processing apparatus 100 in this manner, it becomes possible to improve operability of the touch device further.

Hereinafter, a description will be provided related to a case where a corresponding event is carried out when an event icon displayed on the display screen 13A is selected with reference to the appending drawings.

Figure 15:
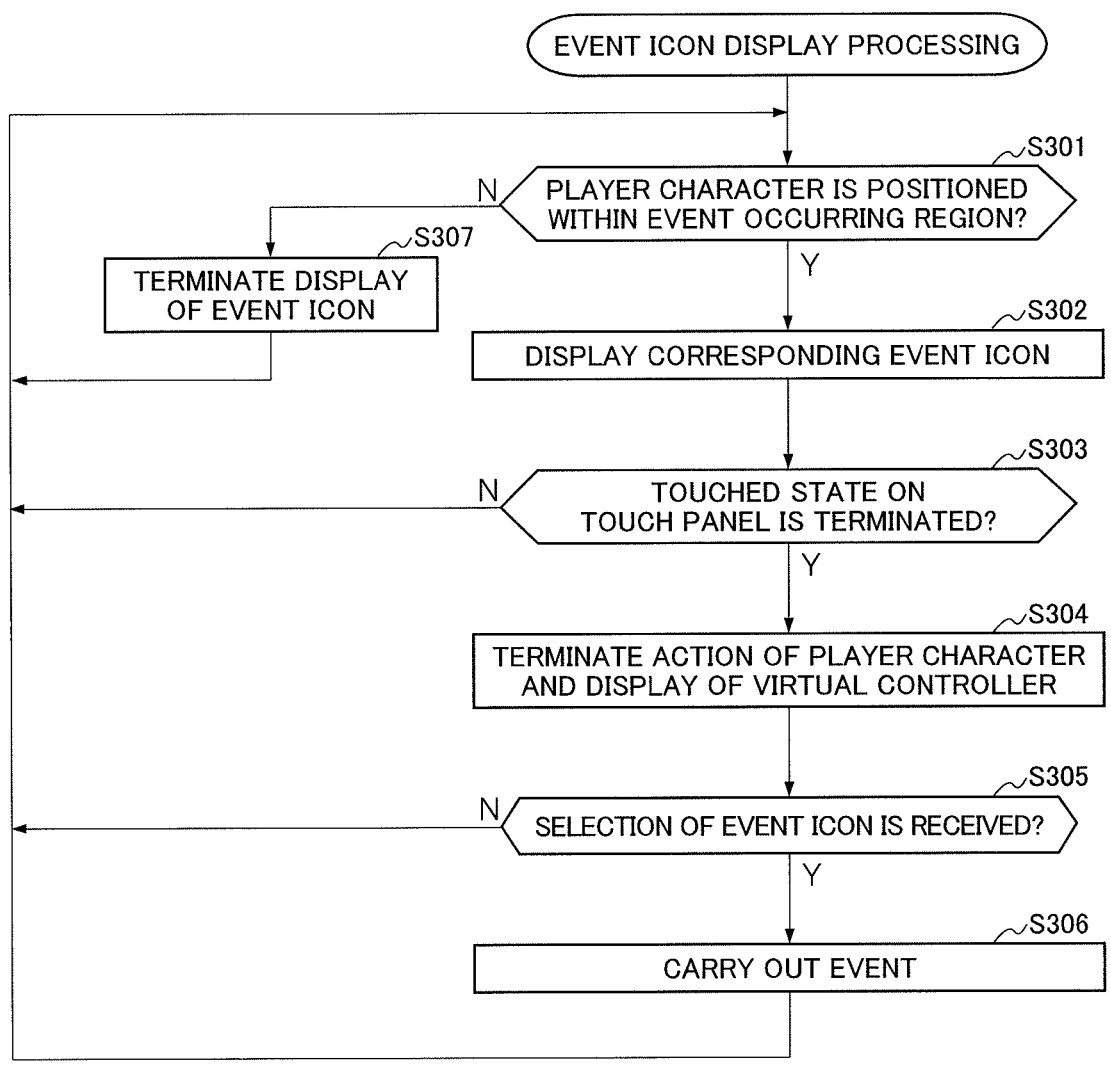
FIG. 15 is a flowchart showing an example of event icon displaying processing.

FIG. 15 is a flowchart showing an example of event icon displaying processing carried out by the video game processing apparatus 100. The event icon displaying processing is started when the player character P1 becomes in an operable state by means of an operation by the player P in accordance with the progress of the video game.

In the event icon displaying processing, the control section 11 first determines whether the player character P1 is positioned within an event occurring region or not (Step S301). Here, the event occurring region means a region in which a predetermined event occurring condition is met. For example, in a case where an event is a "conversation", an event occurring region is provided for each of the other characters within a predetermined distance from a display position of each of the other characters.

In a case where it is determined that the player character P1 is positioned in the event occurring region ("Yes" at Step S301), the control section 11 causes the display screen 13A to display an event icon corresponding to the event occurring region (Step S302). In this case, the event icon may be displayed in the vicinity of the event occurring region or in the vicinity of the virtual controller 101.

Figure 16:
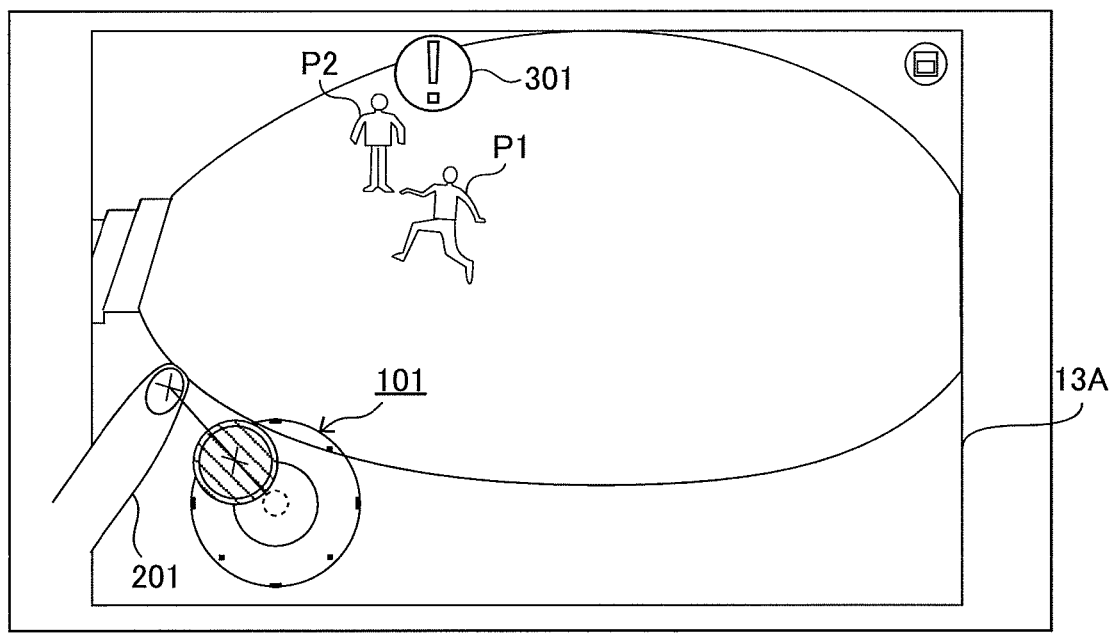
FIG. 16 is an explanatory drawing showing an example of a game screen.

FIG. 16 is an explanatory drawing showing an example of the game screen at this time. As shown in FIG. 16, a game screen displayed on the display screen 13A includes: the virtual controller 101 displayed in response to an operation by the player P; the player character P1 for which movement control is carried out; the non-player character P2; and an event icon 301 which is displayed because the player character P1 is positioned within an event occurring region for the non-player character P2.

When the event icon is displayed, the control section 11 determines whether the touched state on the display screen 13A (that is, the touch panel provided in the display screen 13A) is terminated or not (Step S303). Here, in a case where it is determined that the touched state is not terminated ("No" at Step S303), the control section 11 causes the processing flow to return to Step S301.

On the other hand, in a case where it is determined that the touched state is terminated ("Yes" at Step S303), the control section 11 terminates an action (walking action or running action) of the player character P1 and the display of the virtual controller 101 (Step S304), and receives a selection of the event icon 301 by touching the display position of the event icon 301 (Step S305). Here, in a case where the selection of the event icon 301 is not received ("No" at Step S305), the control section 11 causes the processing flow to return to Step S301.

On the other hand, when the selection of the event icon 301 is received ("Yes" at Step S305), the control section 11 carries out processing necessary for an event corresponding to the event icon 301, that is, a conversation event between the player character P1 and the non-player character P2 (Step S306), and then causes the processing flow to return to Step S301.

In this regard, in a case where it is determined at Step S301 that the player character P1 is not positioned within the event occurring region ("No" at Step S301) and the event icon 301 is displayed, the control section 11 terminates the display of the event icon 301 (Step S307), and causes the processing flow to return to Step S301.

By configuring the video game processing apparatus 100 as described above, it is possible to further improve operability of the touch device.

INDUSTRIAL APPLICABILITY

The present invention is useful to improve operability of a touch device using a touch panel in an operation on an application such as a game operation. Further, the present invention can be applied to general console game machines.

What is claimed is:

1. An apparatus for controlling a progress of a video game, the apparatus comprising:
    a display screen for displaying a user interface element of the video game, the user interface element being displayed with transparency determined during the progress of the video game;
    a computer for receiving an operation to the user interface element displayed on the display screen regardless of the transparency; and
    the computer for controlling the progress of the video game in accordance with the operation to the user interface element displayed on the display screen,
    wherein the transparency of the user interface element is determined, during the progress of the video game, based on the progress of the video game by the player,
    the transparency of the user interface element is further determined to increase in accordance with an operation content to the user interface element, and the transparency of the user interface element is even further determined to increase in accordance with a predetermined operation to the user interface element during the progress of the video game, wherein the predetermined operation occurs when a distance between an initial touched position of a dragging operation to the user interface element and a current touched position of the dragging operation to the user interface element is at least a predetermined distance.

2. The apparatus according to claim 1, wherein the computer detects that the operation to the user interface element displayed on the display screen continues for a certain period, the computer determines the transparency of the user interface element, and the transparency is determined to increase in a case where the operation to the user interface element displayed on the display screen continues for the certain period.

3. The apparatus according to claim 1, wherein the transparency of the user interface element is determined based on a level of the player in the video game.

4. The apparatus according to claim 3, wherein the transparency of the user interface element is determined to increase as the level of the player in the video game increases.

5. The apparatus according to claim 1, wherein, during the predetermined operation, the dragging operation to the user interface element moves an operating section of the user interface element from an initial position of the operating section to the current touched position.

6. A method of controlling a progress of a video game, the method comprising:

displaying a user interface element of the video game on a display screen, the user interface element being displayed with transparency determined during the progress of the video game;

receiving an operation to the user interface element displayed on the display screen regardless of the transparency; and controlling the progress of the video game in accordance with the operation to the user interface element displayed on the display screen, wherein the transparency of the user interface element is determined, during the progress of the video game, based on the progress of the video game by the player, the transparency of the user interface element is further determined to increase in accordance with an operation content to the user interface element, and the transparency of the user interface element is even further determined to increase in accordance with a predetermined operation to the user interface element during the progress of the video game, wherein the predetermined operation occurs when a distance between an initial touched position of a dragging operation to the user interface element and a current touched position of the dragging operation to the user interface element is at least a predetermined distance.

7. The method according to claim 6, wherein the transparency of the user interface element is determined based on a level of the player in the video game.

8. The method according to claim 7, wherein the transparency of the user interface element is determined to increase as the level of the player in the video game increases.

9. The method according to claim 6, wherein, during the predetermined operation, the dragging operation to the user interface element moves an operating section of the user interface element from an initial position of the operating section to the current touched position.

10. A non-transitory computer-readable medium embodying a computer program for controlling a progress of a video game, the computer program causing a computer to execute:

displaying a user interface element of the video game on a display screen, the user interface element being displayed with transparency determined during the progress of the video game;

receiving an operation to the user interface element displayed on the display screen regardless of the transparency; and controlling the progress of the video game in accordance with the operation to the user interface element displayed on the display screen, wherein the transparency of the user interface element is determined, during the progress of the video game, based on the progress of the video game by the player, the transparency of the user interface element is further determined to increase in accordance with an operation content to the user interface element, and the transparency of the user interface element is even further determined to increase in accordance with a predetermined operation to the user interface element during the progress of the video game, wherein the predetermined operation occurs when a distance between an initial touched position of a dragging operation to the user interface element and a current touched position of the dragging operation to the user interface element is at least a predetermined distance.

11. The non-transitory computer-readable medium according to claim 10, wherein the transparency of the user interface element is determined based on a level of the player in the video game.

12. The non-transitory computer-readable medium according to claim 11, wherein the transparency of the user interface element is determined to increase as the level of the player in the video game increases.

13. The non-transitory computer-readable medium according to claim 10, wherein, during the predetermined operation, the dragging operation to the user interface element moves an operating section of the user interface element from an initial position of the operating section to the current touched position.

\* \* \* \* \*